Nov. 7, 1967     C. L. GUTZEIT     3,351,484
CARBON FIBERS AND METHOD
Filed Nov. 14, 1963
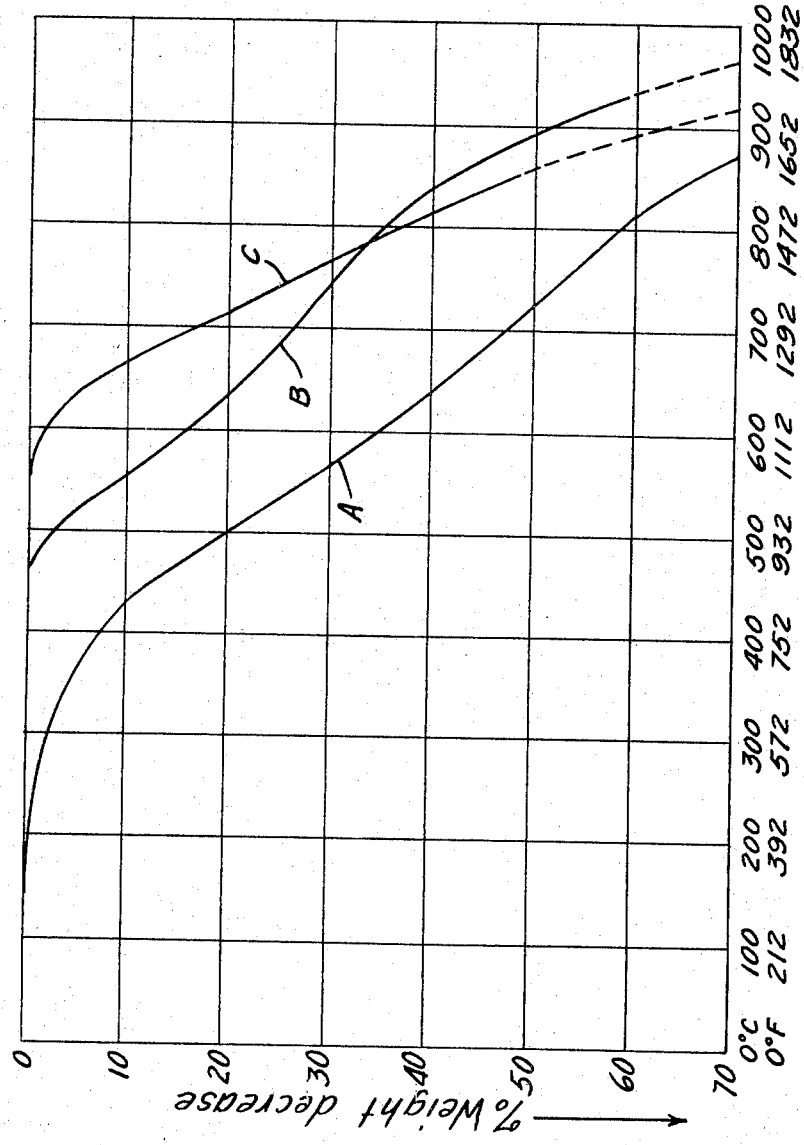
INVENTOR.
Carlos L. Gutzeit
BY
Fraser & Bogucki
Attorneys

United States Patent Office 3,351,484
Patented Nov. 7, 1967

3,351,484
CARBON FIBERS AND METHOD
Carlos L. Gutzeit, Long Beach, Calif., assignor to Hitco, a corporation of California
Filed Nov. 14, 1963, Ser. No. 323,649
7 Claims. (Cl. 117—106)

The present invention generally relates to improved carbon fiber products and more particularly relates to carbon fibers having improved oxidation resistance and to a method of increasing the oxidation resistance of carbon fibers.

Many high temperature components such as reentry vehicle nose cones and rocket nozzles, heat shields, jet engine liners and the like, are currently being fabricated from special types of reinforcing fibers in combination with high temperature plastic binders. For example, the fibers may be of glass, asbestos, mineral wool, high purity silica fibers or the like, all of which exhibit relatively high melting points and some resistance to erosive effects at high temperatures and at high speeds. Such fibers may be essentially continuous and woven into textile form or they may be used in short lengths, e.g. chopped fibers and the like, depending upon the shape of the fabricated component and the particular use to be made of the component. The fiber reinforcements impart improved strength and relatively uniform mechanical properties to the formed components and, as previously indicated, are relatively resistant to the high temperatures which are encountered by the fabricated components during use.

Fibers of graphite have also been used to some extent for high temperature applications, such fibers having been formed by reducing cellulosic products such as cotton and rayon to graphite at extremely high temperatures under controlled conditions. Graphite fibers usually have a lower tensile strength than other materials but this characteristic can be improved upon by controlling fabrication of the fibers. Graphite fibers are light, relatively flexible and their strength characteristics tend to increase with temperature. Such fibers can easily be incorporated into various composite bodies. Because the sublimation point of graphite is very high, graphite fibers are particularly suitable for use at very high temperatures. Moreover, graphite is relatively inert to various types of corrosive agents.

Accordingly, graphite in the form of fibers, woven textiles and the like, can be advantageously used at points of extreme thermal stress, such as constricted areas of rocket engine nozzles, exit cone inserts and the like. However, graphite does have a tendency to spall and, moreover, it has a relatively high heat conductivity so that it provides relatively poor thermal insulation. Accordingly, for protection of a body against very high temperatures where a graphite component is used, it is usually necessary to composite the graphite with a more effective insulating means. This, in turn, results in a heavier weight for the component.

This problem has been at least partially overcome by the substitution of carbon fibers for graphite in certain applications. The term carbon as used herein means amorphous carbon instead of graphite. The thermal conductivity of amorphous carbon is initially much lower than that of graphite and, moreover, increases at a much lower rate with temperature, than does graphite. Accordingly, because of the superior cold-side properties of carbon fibers and tensile strength equal to or greater than that of graphite fibers, carbon fibers are being substituted for graphite fibers in certain high temperature applications. Thus, amorphous carbon fibers have good ablation characteristics, good resistance to char and high strength, are relatively easy to mold and are relatively uniform in characteristics when manufactured in accordance with improved processes as set forth in copending U.S. patent application, Ser. No. 160,605, filed Dec. 19, 1961 and entitled, "Process for Preparing Carbon Fibers," of which Richard B. Millington and Robert C. Nordberg are the inventors. This application has been assigned to the assignee of the present application. Such a process involves driving off volatile tars from cellulosic fibers, such as rayon, by successively higher heat treating steps of 20–50° F. at from 300° F. to not more than about 1000° F., each step being from about 8 to about 30 hours in duration, and then "flash" firing the product at a much higher temperature, for example 1800–2000° F., to remove final water and other volatiles and to heat shrink the product.

Despite the many advantageous properties of carbon fibers, including their resistance to chemical attack, carbon fibers are still subject to severe depreciation by combination with oxygen at elevated temperatures, for example, in excess of about 800° F. Under such circumstances, the oxidized carbon of the carbon fibers volatilizes off the fibers so that loss of fiber mass occurs, with consequent impairment of products incorporating the same.

Accordingly, it is primary object of the present invention to provide improved carbon fibers having increased oxidation resistance.

It is also an object of the present invention to provide a method of permanently increasing the oxidation resistance of carbon fibers.

It is a further object of the present invention to increase the oxidation resistance of carbon fibers, especially at temperatures in excess of 800° F. while preserving the flexibility, unitary structure, low thermal conductivity, erosion resistance and ablative properties, as well as the structural strength and other desired properties of the carbon fibers.

It is also an object of the present invention to provide a simple, effective, inexpensive and rapid method of permanently improving the oxidation resistance of carbon fibers, woven carbon textiles, carbon rovings and other carbon fiber-containing materials.

The foregoing objects are accomplished, in accordance with the present invention, by treating carbon fibers with selected chemicals to provide the surfaces thereof with improved oxidation resistance. This is accomplished by forming in situ on the exposed surfaces of the carbon fibers a protective oxidation resistant boron nitride layer, which layer is integrally bonded to and, of even more importance, forms an integral part of the unitary structure of the carbon fibers. Accordingly, problems of separation of the protective layer from the carbon substrate are avoided.

As a specific example, five lbs. of boric acid and five lbs. of urea are mixed together in the dry state and then heated to about 140° C., that is, above the melting point thereof, then cooled to below 100° C. and dissolved in 30 liters of distilled water. Thereafter, carbon cloth (which has previously been carbonized in successive steps up to a final temperature of 850° F. and which has then been "flash" fired at 1800–2000° F.) is treated by being passed at ambient temperature through the solution, then drained of excess solution and passed through a dryer unit operating at 310° F. The dryer residence time is 5 minutes. The water is driven off of the surfaces of the carbon cloth in the dryer unit and the boric acid-urea complex disposed on the surface of the fibers is melted.

The resulting product is then fired in a nitrogen atmosphere for about one minute at 1800–2000° F. and subsequently cooled to below about 300° F. in nitrogen, after which the product is allowed to cool to ambient temperature in air. During the firing operation, the urea-boric acid complex is reduced to the desired boron nitride coating. The coating is present in a concentration of about 4 percent, by weight of the carbon cloth, on all of the exposed surfaces of the carbon fiber of the cloth. The final concentration of boron nitride on the cloth is predictable before the firing operation because the carbon cloth is known to characteristically absorb about 80 percent by weight of an aqueous solution containing boric acid and urea.

The resulting product contains boron nitride on all exposed surfaces of the carbon fibers and the boron nitride is molecularly bonded to the carbon surface so as to form an integral part thereof. Boron nitride is isoelectronic with carbon, i.e. has the same number of electrons as two carbon atoms, and accordingly, can readily form a molecular bond with carbon of the fibers. Such molecular bond assures a permanent joining of the boron nitride to the remainder of each fiber, i.e. to the carbon fiber substrate so that the product is completely unitary and integral and remains so despite repeated thermal cycling. The boron nitride effectively prevents oxidation of the carbon of the fibers at elevated temperatures and consequent loss of mass of the fibers as volatilized carbon oxide. Accordingly, the durability of the carbon fibers in oxidizing environments, especially at elevated temperatures, is increased.

Further advantages of the present invention will be apparent from a study of the following detailed description and the accompanying drawings of which:

The single figure is a graph depicting oxidation resistance of carbon fibers treated by the method of the invention.

Again referring to the method of the present invention, the method includes in situ forming of boron nitride and molecular bonding of the boron nitride to the exposed surfaces of carbon fibers. The method is carried out by contacting the carbon fibers with a boron- and nitrogen-containing material and subjecting said fibers and said material to elevated temperatures and non-oxidizing conditions sufficient to cause reaction between the boron and the nitrogen to form boron nitride and to effect the desired molecular bonding of the boron nitride to the surfaces of the fibers.

The carbon fibers to be treated can be in the form of bulk, batts, felt, or woven textile fabric, roving, tape and like. The carbon fibers can be prepared in any suitable manner, such as that described in copending United States patent application Ser. No. 160,605 of Millington et al. As a typical example, rayon cloth was scoured free of finishing material, then rinsed with water, drained, dried and then heated from 360° F. to 700° F. in 20° F. increments, each lasting 12–30 hours so as to carbonize the same. After cooling to below 300° F., the fabric was flash fired in a nitrogen atmosphere at 2200° F. for a residence time of about 10 seconds, then immediately immersed in a tank of water to quench the same, rolled up and then dried at 250° F. The carbon fibers of the cloth had high strength and physical integrity and the cloth was uniform in characteristics throughout.

It will be understood that carbon cloth prepared by other procedures instead of that exemplified above can also be utilized in the present method. Moreover, the carbon fibers can be in any suitable form ranging from completely amorphous to substantially crystalline form. In addition, the carbon fibers need only have been subjected to the initial series of carbonizing steps, i.e. sequential treatment between 300° F. and 700–1000° F. The fibers need not have been subjected to a final firing operation as, for example, 1800–2000° F. or the like for removal of final amounts of volatiles and heat shrinking of the fibers. It will be understood that there is no particular advantage in utilizing carbon fibers which have been substantially completely converted from the amorphous state to the fully crystalline or graphitic state, i.e. are essentially graphite, inasmuch as the graphite itself has a relatively high oxidation resistance and does not particularly require protection against oxidizing environments, and inasmuch as graphite has a higher thermal conductivity than amorphous carbon, so that a main advantage of amorphous carbon fibers is lost. Therefore, for practical purposes, the method of the present invention is limited to the treatment of amorphous carbon fibers and products containing the same by steps which avoid conversion of the carbon to graphite.

The boron- and nitrogen-containing material used as the treating agent in the present method includes a boron-containing material such as boric acid, boric oxide or the like capable of heat decomposing to yield boron (for reaction with nitrogen) and a nitrogen-containing material which yields ammonia, or reactive nitrogen and hydrogen, capable of reaction with boron under reducing conditions to form boron nitride. Such nitrogen-containing material may be, for example, urea, urethane, or another suitable material. There should be sufficient amounts of the boron-containing and the nitrogen-containing compounds to produce, in situ, an effectively thick layer of the boron nitride. For most purposes a concentration of boron nitride of between about 1 and about 4 percent, by total weight of the fibers, is sufficient to effectively protect the fibers against oxidative deterioration. Concentrations of boron nitride below about 1 percent, by weight, usually are so thin as to be insufficient to effectively protect the carbon fibers or completely and uniformly enclose the same. Concentrations of boron nitride in excess of about 4 percent by weight usually do not further contribute to the protection of the fibers and may, if considerably larger than about 4 percent, begin to interfere with the remaining properties of the carbon fibers.

The boron- and nitrogen-containing material can be applied to the fibers in any suitable manner so as to uniformly distribute the same over the exposed surfaces of the fibers and effectively cover the same. Thus, the boron-containing material and the nitrogen-containing material, if initially separate, can either be premixed and applied together or can be applied separately to the fibers. It is preferred to form a complex between the boron-containing material and the nitrogen-containing material, which complex will be a liquid at a suitable temperature after removal of solvent containing the same. Thus, the urea-boric oxide complex melts slightly above the boiling point of water (125 to 150° C.; 257 to 302° F.) to form a thin liquid which uniformly wets the carbon surface and penetrates the pores thereof prior to thermal decomposition to form boron nitride. At any rate, this step is carried out so that all exposed surfaces of the carbon fibers to be treated are enclosed within and wetted by the desired concentration of the boron nitride-forming treating material and so that the treating agent penetrates the surface pores of the carbon fibers.

One preferred technique for application of the boron nitride coating to the carbon fibers is to first provide an aqueous solution of boron-containing material and nitrogen-containing material. In this regard, for example, either boric oxide or boric acid can be added directly to water and so also can a suitable nitrogen-yielding compound such as urea or urethane. Preferably, such compounds are completely soluble in water. Moreover, it is preferred to form a complex between the boron-containing compound and the nitrogen-containing compound, and then dissolve the complex in water or other solvent and thereafter contact the carbon fibers with the water solution so that uniform distribution of the boron and nitrogen to all areas of the carbon fiber surfaces and impregnation of all pores and surface irregularities by the boron and nitrogen is readily accomplished.

For example, boric acid and urea can be mixed together, heated to complexing temperature, then cooled and dissolved in water to provide a treating solution in which the carbon fibers can be immersed or with which the carbon fibers can otherwise be contacted, as by spraying, etc.

Since the carbon fibers or cloth usually absorbs an aqueous solution, such as that of boric acid and urea, in a concentration of about 80 percent of the weight of the fibers or cloth, the concentration of the boric acid-urea complex in the solution can be controlled to provide a predictable weight concentration of boron nitride in the finished product.

The water or other medium for the boron- and nitrogen-yielding treating material can then be driven off from the impregnated carbon fibers in any suitable manner, as by passing the fibers through a dryer at above the boiling point of the solvent or medium, for example, water, and a temperature of, for example, of more than about 310° F., preferably a temperature which melts the boron- and nitrogen-containing complex, if any, allowing it to soak into the pores and surface irregularities in the fibers to assure complete sealing of all exposed surfaces of the fibers. This can readily be accomplished by exposing the coated carbon fibers to a temperature of 310 to 320° F. for a short period of time, for example, about 5 to 10 minutes.

Thereafter, the carbon fibers can either be cooled and subsequently fired or can be passed directly to a firing operation wherein the boron- and nitrogen-containing compound is converted in situ on the fibers to boron nitride which molecularly bonds to the surface of the fibers. The firing operation can take place at any suitable temperature sufficiently high to cause reduction or conversion of the boron- and nitrogen-containing materials to boron nitride and the desired molecular bonding but below that temperature which converts the carbon fibers to graphite fibers. It has been found that it is preferred to carry out the firing step at the relatively low temperatures of about 1800–2000° F. and that the firing time can be relatively short, for example substantially less than one minute. Since carbon fibers are involved, the firing should be carried out under non-oxidizing conditions, e.g. vacuum, nitrogen, hydrogen, an inert gas such as krypton, argon, xenon, neon or the like. It will be further understood that the firing step can have a dual purpose in that if the carbon fibers have not been previously fired but are only in the carbonized state, such firing operation in accordance with the present method not only provides the carbon fibers with the desired boron nitride protective coating but, in addition, drives off remaining volatiles from the fibers and shrinks the fibers so as to convert them from the carbonized condition to the fully fired and finished condition. Such firing enhances the durability of the fibers. Accordingly, if desired, the present method can be incorporated into and form a part of an overall method for the conversion of cellulosic fibers to finished carbon fibers.

It is desirable to reduce the temperature of the boron nitride coated carbon fibers from the firing temperature of, for example 1800–2200° F., to below about 350° F. rapidly and with suitable protection of the fibers against reaction of components of the coating of the fibers with impurities at firing temperature, etc. Accordingly, the firing step is carried out in the described vacuum or reducing or inert atmosphere, and, moreover, for convenience and efficiency the subsequent cooling step is also usually carried out in the presence of the described vacuum or inert or reducing gas. However, the cooling to below 350° F. could, if desired, be carried out in air or any other suitable medium, inasmuch as the finished carbon fibers are suitably protected against oxidation at elevated temperatures due to the presence of the boron nitride coating on all exposed surfaces thereof.

A second technique of providing the carbon fibers with the desired boron nitride coating, in accordance with the present method, involves initially providing the fibers with a surface coating of one of the two basic constituents, that is, a boron-containing material and subsequently providing the nitrogen-containing material in reactable form during the firing step. For example, boric oxide or boric acid can be dissolved in water to form an aqueous boric acid solution which is then used to impregnate the carbon fibers to be treated. After removal of the medium, water, as by drying, as previously described, the dried coated carbon fibers are fired at a sufficiently high temperature, for example 1800–2200° F. in an ammonia atmosphere to effect reaction between the boron of the boric oxide resulting from the drying step, and the nitrogen of the ammonia blanket to form in situ on the surfaces of the carbon fibers the desired boron nitride coating and to molecularly bond the same to said surfaces.

In order to obtain the desired reaction utilizing nitrogen from the blanket gas as a reactant, it is necessary that the blanket gas be capable of reacting to yield the nitrogen for the boron nitride formation at a suitably low temperature. Thus, ammonia reacts at the desired firing temperature to form boron nitride with the boron. However, it has been found that if a nitrogen blanket were to be utilized instead of ammonia, the desired reaction between the boron and nitrogen would not take place at a sufficiently low temperature for the purposes of the present invention. In other words, too great a heat outlay would be involved and there would be danger of graphitization of the carbon fibers and, therefore, depreciation of the thermal insulating qualities thereof if nitrogen gas were used. Accordingly, nitrogen gas is not a suitable reagent for the purposes of the present method. Instead, a gas such as ammonia should be used. It will also be understood that the nitrogen need not be derived from the blanket gas, if any, but, instead, may be derived from other material introduced separately from the blanket gas into the zone wherein the firing step is carried out.

The following examples further illustrate certain features of the present invention:

*Example 1*

A mixture of 2 pounds of boric acid and 2 pounds of urea is heated to a complexing temperature of 150° C., then cooled to below 100° C. and subsequently dissolved in 12 liters of distilled water. A mass of carbon fibers in the fully fired state, i.e., having been previously prepared by initially heating rayon fiber cloth in successive steps up to a temperature of about 1000° F. and then subjecting the carbonized fiber cloth to a flash firing operation at 1800–2200° F., is immersed in the solution. Thereafter, the solution is drained from the mass of carbon fibers and the mass is spread out on a grid and passed through a dryer at about 315° F. for a dryer residence time of about 5 minutes. The drying step results in removal of the water of the solution from the coating on the fibers and melting of the boric acid-urea complex forming the coating. The melted complex spreads over the entire surface of the fibers so as to completely cover and wet the same and fill and seal all surface pores and irregularities thereof. The coated mass of fibers is then passed directly into a firing furnace containing a nitrogen atmosphere and is exposed to a temperature of about 1900° F. for a contact time of about 15 seconds, wherein the boron of the coating reacts with the nitrogen of the urea of the coating to form, in situ, boron nitride and to molecularly bond the same to the surface of the carbon, while the remaining constituents of the boric oxide (acid) and the urea are volatilized from the surface of the carbon fibers.

The product is then allowed to cool to ambient temperature in the nitrogen atmosphere and is thereupon removed from the furnace and tested. It is found that molecular bonding has occurred between the boron nitride and the carbon fiber surface and that all carbon fibers are unitary in structure and exhibit complete encasement of the carbon thereof within a thin shell or layer of boron nitride which constitutes about 4 weight percent of each fiber. The tests further indicate that although the boron nitride coated carbon fibers have substantially similar thermal conductivity, appearance, flexibility, tensile strength and chemical resistance to uncoated carbon fibers, they also have substantially improved oxidation resistance in comparison with uncoated carbon fibers.

Data verifying the increased oxidation resistance of the boron nitride treated carbon fibers is set forth in the single figure of the accompanying drawings wherein the oxidation resistance test results on the boron nitride coated carbon fibers is presented in graph form along with the results on the same but uncoated fibers and on uncoated graphite fibers.

The test fibers were in the form of cloth. One gram specimens were increased in temperature from ambient temperature to about 900° C. at the rate of 10° C. per minute while the specimens were subjected to an air flow of 1 s.c.f. (standard cubic feet) per hour. The loss of weight of the specimens was plotted during the course of the test as a measure of oxidation resistance. The dotted portions of lines B and C represent extrapolations beyond actual test results.

It will be noted from the single figure that uncoated carbon cloth (line A) had a substantially lower oxidation resistance at all temperatures carried out for the test than either the graphite cloth (line C) or the boron nitride (4 wt. percent) coated carbon cloth (line B), prepared in accordance with the present method. Moreover, although the oxidation resistance of the boron nitride coated carbon cloth was somewhat lower than that of the graphite cloth at temperatures ranging from about 500° C. to about 800° C., as previously indicated, the boron nitride coated carbon cloth had higher oxidation resistance than graphite cloth at temperatures in excess of about 800° C. Accordingly, the efficiency of the boron nitride coating in increasing oxidation resistance of the carbon fibers was demonstrated.

*Example II*

Carbon cloth, previously formed from rayon cloth by first washing the rayon cloth in an aqueous solution of a detergent at 170° F. for one hour and then washing the rayon free of the detergent, drying the rayon and subjecting the rayon to a series of carbonizing steps in the temperature range of from 400° F. to 850° F. at not more than 50° F. increase in temperature per step and with a minimum residence time of about 12 hours at each temperature, is treated in the unfired state by the present method.

In this regard, 5 pounds of boric acid and 5 pounds of urea are first mixed together, then heated to 130–150° C. to fuse the same into a boric acid-urea complex, then cooled to below 100° C. and dissolved in 30 liters of distilled water. The carbonized unfired carbon cloth is then passed through the solution and allowed to drain, the cloth absorbing an amount of the solution equal to about 80 percent of the weight of the cloth. The cloth is then dried at 310° F. for 5 minutes so as to drive off water and so as to melt and flow the complex uniformly over the surface thereof, after which the cloth is passed into a furnace containing a nitrogen atmosphere and having an operating temperature of 1800° F., and is held in that furnace for a period of about 30 seconds. During the firing, the complex decomposes. Thus, the boric oxide formed during the drying step is reduced to boron and the urea is reduced to nitrogen, the boron and nitrogen thereupon reacting to form boron nitride and to molecularly bond the boron nitride to the surface of the fibers. The product is then cooled in the nitrogen atmosphere to about 300° F. and then allowed to cool to ambient temperature in air.

This product is identical to and exhibits the same characteristics as the product of Example I, the carbon fibers themselves being in the completely fired state and the boron nitride coating thereon protecting the fibers against oxidation.

*Example III*

An amount of 2.7 pounds of boric oxide is added to 30 liters of water to form a boric acid solution. Carbon cloth substantially identical with the uncoated carbon cloth of Example I, i.e., fully carbonized and fully fired, is passed through the boric acid solution, then dried at 300° F. for 10 minutes, and then fired at 2000° F. in a furnace for about 30 seconds in the presence of a continuous stream of ammonia, i.e., non-oxidizing conditions. The boric oxide coating on the fibers is converted to boron nitride by reaction with the nitrogen of the ammonia. The fibers are then cooled to ambient temperature in an oxygen-free atmosphere. This product exhibits essentially the same characteristics as the product of Examples I and II.

The preceding examples clearly illustrate that carbon fibers can be treated in a simple, effective and inexpensive manner to improve the oxidation resistance thereof by disposing on all exposed surfaces thereof a boron nitride coating which is formed in situ and is molecularly bonded to the carbon fibers to provide a unitary product. This boron nitride coating fills all surface pores and irregularities of the fibers and in effect completely encapsulates and jackets the fibers. The fibers otherwise exhibit essentially the same characteristics as before the boron nitride treatment, i.e., essentially the same thermal conductivity, flexibility, strength, electrical conductivity and the like. However, the oxidation resistance of the carbon fibers is increased substantially so that at temperatures of above about 800° C. it exceeds that of graphite fibers and at all temperatures substantially exceeds that of untreated carbon fibers. The boron nitride coating may be present in any suitable concentration, for example between about 1 to about 4 weight percent, on the surface of the fibers. Moreover, the present method can be incorporated into a method of manufacture of the carbon fibers in that the firing step called for in the present method can be utilized in place of the final firing step in the manufacture of the carbon fibers themselves. Other advantages of the invention are as set forth in the foregoing.

Various modifications, changes, alterations and additions can be made in the present method and in the present product of the method. All such changes, additions, alterations and revisions as are within the scope of the appended claims form a part of the present invention.

What is claimed is:

1. A flexible carbon fiber product having improved oxidation resistance, which product comprises a substrate of flexible amorphous carbon fiber in a fully fired heat shrunk condition, and a thin flexible surface coating of boron nitride extending over essentially all of the surface area of the substrate and molecularly bonded to the surface of the substrate, whereby the product is unitary in structure, the boron nitride coating being present in a concentration of between about 1 and about 4 percent, by weight of the product and having been formed in situ on the surface of said carbon fibers at an elevated temperature below that at which substantial graphitization of carbon fiber occurs and in a non-oxidizing atmosphere.

2. A method of treating carbon fibers to increase the oxidation resistance thereof, which method comprises forming a thin flexible coating of boron nitride in situ on the surfaces of carbon fibers in a concentration of between about 1 and about 4 percent, by weight of the product of said coating and fibers at an elevated temperature below graphitizing temperature and under non-oxidizing conditions and molecularly bonding the formed boron nitride as a continuous flexible layer to said surfaces, whereby the oxidation resistance of the carbon fibers is increased while the flexibility and strength thereof are preserved.

3. The method in accordance with claim 2 wherein the carbon fibers are initially impregnated with and substantially completely covered by a nitrogen- and boron-yielding material and said material is set on the surface of said fibers, after which the fibers are fired under non-oxidizing conditions and at a temperature in excess of about 1650° F. for a time sufficient to substantially completely convert said material in situ on said fibers to boron nitride and to molecularly bond the boron nitride to the surfaces of said fibers so as to form a continuous, protective permanent flexible enclosing layer around said fibers, whereby the oxidation resistance of said fibers is increased while the flexibility thereof is unimpaired.

4. The method in accordance with claim 3 wherein carbon fibers are initially impregnated with an aqueous solution of a urea-boric acid complex formed by fusing urea and boric acid together and then dissolving the complex in water, and wherein the coated fibers are then dried to set the complex and then fired.

5. A method of treating carbon fibers to provide a carbon fiber product having increased oxidation resistance at elevated temperatures, which method comprises heating carbon fibers in contact with boron- and nitrogen-yielding material under non-oxidizing conditions for a time and at a temperature sufficient to form a layer of boron nitride on the exposed surface of said carbon fibers and molecularly bond said layer to said surface, said temperature being maintained below graphitizing temperature during said heating, said boron-nitride layer being formed in a concentration of between about 1 and about 4%, by weight, of the carbon fiber product during said heating, whereby the oxidation resistance of the carbon fiber product is permanently increased.

6. The method in accordance with claim 5 wherein carbon fibers are initially impregnated with and substantially completely covered by a first material which yields boron at elevated temperature and said material is set on the surfaces of said fibers, after which the fibers are fired in the presence of a second material which yields nitrogen at elevated temperatures for a time sufficient and a temperature sufficient to cause reaction between said boron and nitrogen to provide in situ on the exposed surfaces of said fibers a thin continuous, permanent, protective flexible layer of boron nitride molecularly bonded to said surface, whereby the fibers are enclosed in said boron nitride and effectively protected against oxidative deterioration while retaining their flexibility and strength.

7. The method in accordance with claim 6 wherein said first material comprises boric acid which is dissolved in water and applied to the fibers, wherein the aqueous solution of boric acid is dried on the fibers to set and convert the boric acid to boric oxide and wherein the dried coated fibers are fired at a temperature in excess of 1650° F. in the presence of ammonia and for a time sufficient to substantially completely convert the boric oxide to boron nitride in situ on said fibers.

References Cited

UNITED STATES PATENTS

| | | | |
|---|---|---|---|
| 455,187 | 6/1891 | Erlwein | 117—169 X |
| 1,738,976 | 12/1929 | Vivas | 117—137 |
| 2,839,426 | 6/1958 | Gerby | 117—106 |
| 2,865,715 | 12/1958 | Kamlet | 23—191 |
| 2,992,960 | 7/1961 | Leeg et al. | 117—143 X |
| 3,071,637 | 1/1963 | Horn et al. | 136—36 |
| 3,108,018 | 10/1963 | Lewis | 117—46 X |
| 3,131,089 | 4/1964 | Grulke et al. | 117—228 |
| 3,152,006 | 10/1964 | Basche | 117—169 X |
| 3,189,477 | 6/1965 | Shaffer | 117—169 X |

FOREIGN PATENTS

| | | |
|---|---|---|
| 699,790 | 12/1964 | Canada. |
| 1,190,308 | 3/1959 | France. |
| 1,222,837 | 6/1960 | France. |
| 10,742 | 5/1891 | Great Britain. |
| 874,165 | 8/1961 | Great Britain. |
| 951,280 | 3/1964 | Great Britain. |

OTHER REFERENCES

Finlay, Gordon R. and Fetterley, Guy H., "Boron Nitride—An Unusual Refractory," 31 Ceramic Bulletin, 4, pp. 141–143.

Wohler, Friedrich et al., Annalen der Chemie und Pharmacie., 151, 255 (1869) QD 1 L7.

WILLIAM D. MARTIN, *Primary Examiner.*

W. D. HERRICK, *Assistant Examiner.*